United States Patent [19]
Berman

[11] 3,790,816
[45] Feb. 5, 1974

[54] ENERGY STORAGE AND TRANSFER POWER PROCESSOR WITH SELF-CONTAINED PARAMETRIC REGULATING LOOP

[75] Inventor: Baruch Berman, Palos Verdes Peninsula, Calif.

[73] Assignee: TRW Inc., Redondo Beach, Calif.

[22] Filed: Mar. 30, 1972

[21] Appl. No.: 239,568

[52] U.S. Cl. .............................. 307/149, 180/65 R
[51] Int. Cl. ............................................. H02j 7/00
[58] Field of Search....................... 307/149; 74/859

[56] References Cited
UNITED STATES PATENTS
3,566,717  3/1971  Berman et al. ...................... 74/859

Primary Examiner—J. R. Scott
Assistant Examiner—M. Ginsburg
Attorney, Agent, or Firm—Daniel J. Anderson; Donald R. Nyhagen; Jerry A. Dinardo

[57] ABSTRACT

An energy storage and transfer power processor having an inductive or inertial energy transformer for transferring energy from a power source to a load in repetitive energy transfer cycles each having an energy storage phase during which the transformer stores energy from the power source and an energy delivery phase during which the transformer delivers stored energy to the load. The power processor has its own parametric regulating loop for sensing a control parameter which deviates from a steady state value concurrently with deviation of the processor from an equilibrium condition wherein the energy stored in and the energy delivered by the energy transformer during successive transfer cycles remain equal and constant, such that average stored energy level in the storage means remains constant at a steady state level. The regulating loop regulates the transformer duty cycle in response to departure of the control parameter from its steady state value as a result of changes in the processor input and/or output conditions to instantaneously restore the processor to equilibrium. The invention may be utilized in both electrical and mechanical energy transfer systems to maintain a selected system output quantity at a steady state value which may be fixed or varied by command.

7 Claims, 7 Drawing Figures

ENERGY STORAGE AND TRANSFER POWER PROCESSOR WITH SELF-CONTAINED PARAMETRIC REGULATING LOOP

BACKGROUND OF THE INVENTION

1. Field of the Invention

This invention relates generally to inductive and inertial energy storage and transfer power processors of the kind which alternately store energy from a power source and deliver stored energy to a load in repetitive energy transfer cycles. The invention relates more particularly to such a power processor having its own parametric regulating loop for maintaining the processor in equilibrium and to a method of regulating the processor to maintain equilibrium.

2. Prior Art

Energy storage and transfer power processors of the kind to which this invention pertains are operatively connected between a power source and a load to form an energy transfer system wherein energy transfer occurs from the power source, through the processor, to the load. Such an energy processor has an inductive or inertial energy transformer, hereafter referred to generically as a kinetic energy transformer or simply an energy transformer, including an energy storage means and switching means for effecting energy transfer to the load in repetitive energy transfer cycles each having an energy storage phase and an energy delivery phase. During the storage phase of each energy transfer cycle, the storage means stores energy from the power source. During the delivery phase of each cycle, stored energy from the storage means is delivered to the load.

The energy storage and transfer power processor has a duty cycle which is defined as the ratio of the transfer cycle storage or delivery phase period to the total transfer cycle period. Regulation of this duty cycle regulates the rate of energy transfer and hence the power delivered to the load during each cycle.

An energy storage and transfer power processor may be utilized in both electrical and mechanical energy transfer systems. One example of an electrical energy transfer system having such a processor is described in a paper entitled "Battery Powered Regenerative SCR Drive," published in the 1970 edition of the IEEE IGA Conference Record. This drive and other related drives are also discussed in a paper entitled "Electric Car Drives Design Considerations," presented to the Society of Automotive Engineers, Automotive Engineering Congress, Detroit, Michigan, Jan. 10-14, 1972, and in the references cited in the latter paper. An example of a mechanical energy transfer system embodying an energy storage and transfer processor is an inertial press. Other examples of energy transfer systems are found in the following patents:

| | | |
|---|---|---|
| 2,600,897 | 3,205,966 | 3,367,438 |
| 2,758,661 | 3,211,249 | 3,515,968 |
| 3,171,505 | 3,348,623 | 3,566,717 |

The above referenced battery powered drive is a time ratio controlled regenerative battery powered vehicle drive system which may be described in general terms as having a motor-generator (torquer) connected across a storage battery, an inductive energy storage means which may be the field winding of the torquer, and a power switch for controlling current flow through the system. The drive system is operable in a regenerative mode and a drive mode. In the regenerative mode, the torquer operates as a generator driven from the output shaft, and the power switch is operated between alternate "off" and "on" states to effect alternate storage of electrical energy from the torquer in the energy storage means and delivery of the stored energy plus the output of the torquer to the battery to charge the battery. In the drive mode, the power switch is again operated between its "off and on" states to effect alternate storage of electrical energy from the battery in the storage means and delivery of the stored energy to the torquer which then operates as a motor to drive the output shaft. In drive mode, electrical energy is delivered to the load (i.e. torquer) to drive the output shaft in the "on" state of the switch. In the regenerative mode, energy is delivered to the load (i.e. battery) in the "off" state of the power switch to charge the battery and produce braking torque. The ratio of the "on" time of the switch to the total time or period of each "off-on" cycle of the switch (i.e. "off" time plus "on" time) is referred to as the duty cycle of the switch. This duty cycle is regulated, to regulate the power delivered to the load, in response to actuation of a control, such as a throttle pedal, which is adjustable to command a range of driving torques in the drive mode and a range of braking torques in the regenerative mode.

The inertial press referred to earlier has a motor driven flywheel which operates a reciprocating ram through a clutch mechanism. During press operation, work material is fed past the ram, and the clutch mechanism is actuated periodically to effect driving of the ram through a working stroke by the kinetic energy of the rotating flywheel. In this type of machine, the flywheel provides an inertial energy storage means in which energy is stored by the wheel drive motor and from which energy is periodically extracted during the working strokes on the ram.

It is apparent from the above discussion that the described systems are energy transfer systems having a power source, a load, and an energy storage and transfer power processor for transferring energy from the power source to the load in repetitive energy transfer cycles each having an energy storage phase and an energy delivery phase. During each storage phase, energy from the power source is stored in the energy storage means of the processor. During each energy delivery phase, stored energy is transferred from the storage means to the load.

Energy transfer systems of this kind are characterized by a common problem with which the present invention is concerned. The problem referred to involves maintaining the transfer systems in equilibrium during commanded steady state operation so as to maintain a controlled output quantity of the systems at a steady state value. If such equilibrium is not maintained, the energy transfer process will converge toward zero output or toward infinite output, limited only by the physical constrictions of the power source and load, with a resultant wide excursion of the controlled quantity from its steady state value. In this regard, consider the simple example of an inertial punch press powered by an unregulated drive motor. If parts are stamped at too slow a rate, the flywheel speed will increase to a value limited only by the horsepower of the driving motor and the energy losses. If parts are stamped at an excessive rate, the flywheel speed will decrease to zero. Accordingly, sustained operation of such a press in equilibrium speed requires stamping of parts at a rate which maintains an approximately constant average flywheel speed.

Various methods have been devised for maintaining in equilibrium energy transfer systems of the character described. One method, for example, utilizes servo means for regulating the duty cycle of the energy storage and transfer processor in response to changes in the controlled quantity. This control method is not satisfactory, however, because of the large size of the energy storage means required and the remote location, relative to the processor, at which system changes are sensed. This remoteness creates time lags which permit substantial excursions of the controlled quantity before corrective action occurs. Another method of maintaining equilibrium involves the use of a regulated power source. This latter method of control is also unsatisfactory for many applications, however, because of the inability or difficulty of regulating the rate of energy transfer.

SUMMARY OF THE INVENTION

The present invention provides an improved method of and means for maintaining in equilibrium energy transfer systems of the class described, that is energy transfer systems which utilize an inductive or inertial energy storage and transfer power processor including a kinetic energy transformer for transferring energy from a power source to a load. More specifically, the invention provides a novel energy storage and transfer power processor, hereafter referred to in places as a power processor or simply a processor, which maintains itself, and thereby also the energy transfer system embodying the processor, in an equilibrium condition. As noted earlier, this equilibrium condition is one wherein the energy stored in the energy transformer and the stored energy delivered from the transformer during successive energy transfer cycles remain equal and constant, such that the average stored energy level in the transformer remains at a steady state level.

To this end, the power processor is provided with its own parametric regulating loop for maintaining equilibrium. This regulating loop includes means for sensing a control parameter which deviates from a steady state value concurrently with deviation of the processor from equilibrium and means for regulating the processor duty cycle in response to departure of the control parameter from its steady state value as a result of changes in the processor input and/or output conditions and in such a way as to instantaneously restore the processor to equilibrium. The response time of the regulating loop is on the order of the period of the energy transfer cycles so that restoration of the processor to equilibrium occurs without any significant excursions of the controlled quantity of the energy transfer system in which the processor is used.

The invention may be utilized in both electrical and mechanical energy transfer systems whose rate of energy transfer is either fixed or regulated by command. Depending upon the type of energy transfer system in which the processor is used and/or the system output quantity to be controlled, the duty cycle of the processor may be regulated in response solely to the control parameter or in response jointly to the control parameter, the controlled output quantity of the energy transfer system and/or an operator command.

The invention is described in connection with the battery powered regenerative vehicle drive system discussed earlier. In this application, the energy storage and transfer processor transfers energy between the battery and torquer of the drive system. The torquer field is utilized as the energy storage means of the processor. The control parameter in response to which the duty cycle of the processor is regulated by its parametric regulating loop to maintain equilibrium is current flow through the torquer field. The duty cycle is regulated in response to both the control parameter and a throttle pedal command to both regulate the driving or braking torque, as the case may be, produced by the torquer in response to adjustment of the throttle pedal and maintain the drive system in equilibrium in any given fixed throttle pedal position.

This described application of the invention is somewhat unique in that the control parameter in response to which the duty cycle is regulated and the output quantity to be controlled are the same, i.e. torquer current or torque. The invention may be used in systems wherein the control parameter and controlled output quantity are different as, for example, a vehicle drive system wherein the controlled quantity is torquer speed rather than torque. In fact, systems where the control parameter and control quantity are different must retain the self-contained parametric regulating loop. The control quantity is than used to command the parametric loop.

DESCRIPTION OF THE PREFERRED EMBODIMENTS

Figure 1:
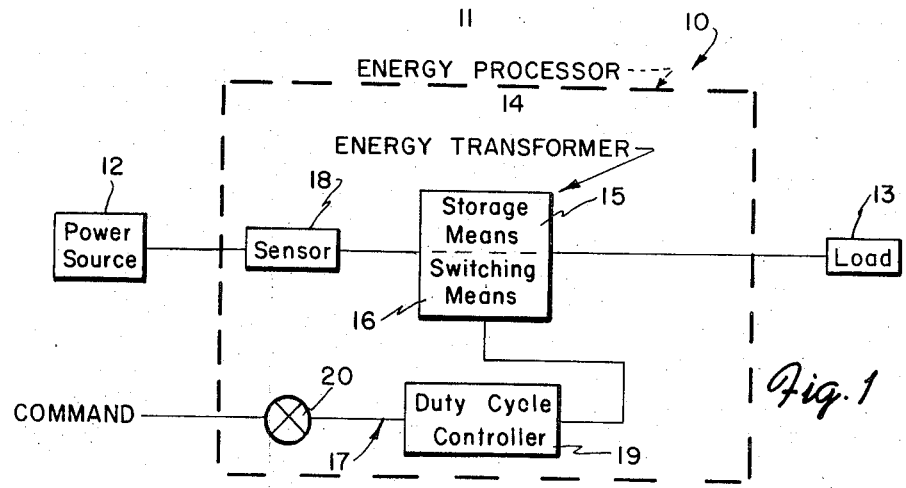
FIG. 1 is a block diagram of the invention.

References is made first to FIG. 1 illustrating a block diagram of an energy transfer system 10 embodying an energy storage and transfer power processor 11 according to the invention for transferring energy from a power source 12 to a load 13. Processor 11 has a kinetic energy transformer 14 including energy storage means 15 and a time ratio switching means 16 for effecting energy transfer from the power source to the load in repetitive energy transfer cycles each having an energy storage phase during which the storage means stores energy from the power source and an energy delivery phase during which the power source and/or storage means deliver energy to the load.

Sustained steady state operation of the energy transfer system 10 is achieved by maintaining the power processor 11 in a condition of equilibrium, wherein the energy stored in and the stored energy delivered by the processor during successive energy transfer cycles remain equal and constant, such that the average stored energy level in the processor remains at a steady state value. Unless such equilibrium is maintained, the energy transfer process will converge toward zero or toward infinite output, limited only by the power source and load constrictions.

According to the present invention, sustained equilibrium of the processor 11 is accomplished by selecting a control parameter which instantaneously reflects a departure of the processor from equilibrium and providing the processor with its own parameteric regulating loop 17 for regulating the processor duty cycle in response to the control parameter to restore equilibrium. The control parameter selected is one which has a steady state value when the processor is in equilibrium and departs from this value in response to and concurrently with any change in the processor input and/or output conditions. Regulating loop 17 includes a sensor 18 for sensing the selected control parameter and control means 19 for regulating the processor duty cycle, i.e. ratio of transfer cycle phase period to total transfer cycle period, in response to departure of the control parameter from its steady state value. This duty cycle regulation restores the processor to equilibrium and thereby the control parameter to its steady state value. The rate of energy transfer through the power processor 11 may be relatively constant or subject to regulation by command. In the latter case, the control parameter output from the sensor 18 and the command are combined in an error detector 20 whose output is supplied to the duty cycle control 19. The rate of energy transfer, or level of any output quantity, is established by the command, and the regulating loop maintains the processor in equilibrium at the energy transfer rate or level of output quantity established by any given fixed command.

Figure 2:
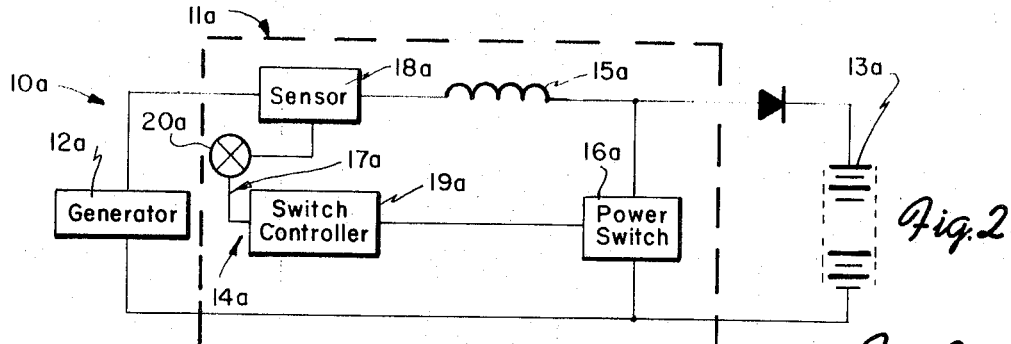
FIG. 2 illustrates an energy transfer system embodying the invention.

FIG. 2 illustrates an electrical energy transfer system 10a embodying an inductive energy storage and transfer power processor 11a according to the invention for transferring electrical energy from a variable low voltage d.c. generator (power source) 12a to a higher quasi fixed voltage battery (load) 13a. The kinetic energy transformer 14a of the processor 11a comprises an inductor (energy storage means) 15a in series with the generator and battery and a time ratio power switch (switching means) 16a in parallel with the battery. The parametric reguating loop 17a of the processor comprises a current sensor (control parameter sensor) 18a in series between the generator and inductor, an error detector 20a, and a switch controller (duty cycle controller) 19a for operating the power switch ON (closed) and OFF (open) positions.

Controller 19a operates the power switch 16a between its ON and OFF positions alternatively in such a way that each ON period of the switch is inversely proportional to the error from the detector 20a. Each time the switch assumes its ON position, electrical energy from the generator 12a is stored in the inductor 15a. Each time the switch assumes its OFF position, the energy stored in the inductor plus the output of the generator are delivered to the battry 13a. Thus, the processor 11a transfers energy from the generator 12a to the battery 13a in repetitive energy transfer cycles each having an energy storage phase and an energy delivery phase.

In this energy transfer system, equilibrium obviously depends on equilibrium in the inductor 15a, i.e.

$$(V_g)(I)(t_{ON}) = I(V_B - V_G)t_{OFF} \quad (1)$$

where:
- $V_g$ = generator voltage
- $V_B$ = battery voltage
- $I$ = generator and inductor current
- $t_{ON}$ = time power switch is ON (energy storage phase period)
- $t_{OFF}$ = time power switch is OFF (energy delivery phase period)

$T = t_{ON} + t_{OFF}$ (total energy transfer cycle period)

$$\alpha = (t_{ON}/t)(\text{duty cycle}) = (V_B - V_g)/V_B \quad (2)$$

From the foregoing, it is clear that the duty cycle $\alpha$ of the energy processor 11a is dependent on the constricting voltage conditions of the generator 12a and battery 13a and that equilibrium requires regulation of the duty cycle in response to variations in the generator or battery voltage to satisfy equations (1) and (2). Thus, if the difference between generator and battery voltage or the ratio shown in equation (2) drops below a selected steady state value, the duty cycle must be decreased by decreasing $t_{ON}$ to maintain equilibrium. Conversely, if the differnce between generator and battery voltage or the ratio in equation (2) rises above its steady state value, the duty cycle must be increased by increasing $t_{ON}$ to maintain equilibrium.

It is evident that the current flow I through the energy transfer system 10a reflects such changes in the generator or battery voltage. That is to say, the current decreases at an increasing rate with a decreasing difference between the battery and generator voltages. The current increases at an increasing rate with an increasing difference between the battery and generator voltages. The current has an average steady state value when the system is operating in equilibrium with the generator, battery and other transfer elements operating at their selected steady state values. The parametric regulating loop 17a of the power processor 11a utilizes the current flow as a control parameter and regulates the duty cycle of the processor in response to departure of this control parameter from its steady state value to maintain the process and thereby the energy transfer system in equilibrium. Thus, the switch controller 19a, which may be a pulse width modulator controlling a solid state power switch 16a, operates the switch between its OFF and ON states alternately and regulates the duration of the ON periods ($t_{ON}$) of the switch in response to the current flow I through the sensor 18a to maintain the current at its steady state level and thereby the energy transfer system 10a in equilibrium.

The battery powered regenerative vehicle drive system 20 illustrated in FIGS. 3 through 7 represents another physical implementation of the energy transfer system of FIG. 1. Except for its inclusion of the present equilibrium detection and control invention, the drive system is like that described in the earlier mentioned IEEE paper. The drive has an electrical storage battery 22, a motor-generator (torquer) 24, and an energy storage and transfer power processor 26 connecting the battery and torquer. The torquer 24 is typically a series type d.c. traction motor rated for high speed operation and is coupled to the vehicle drive shaft S.

Figure 5:
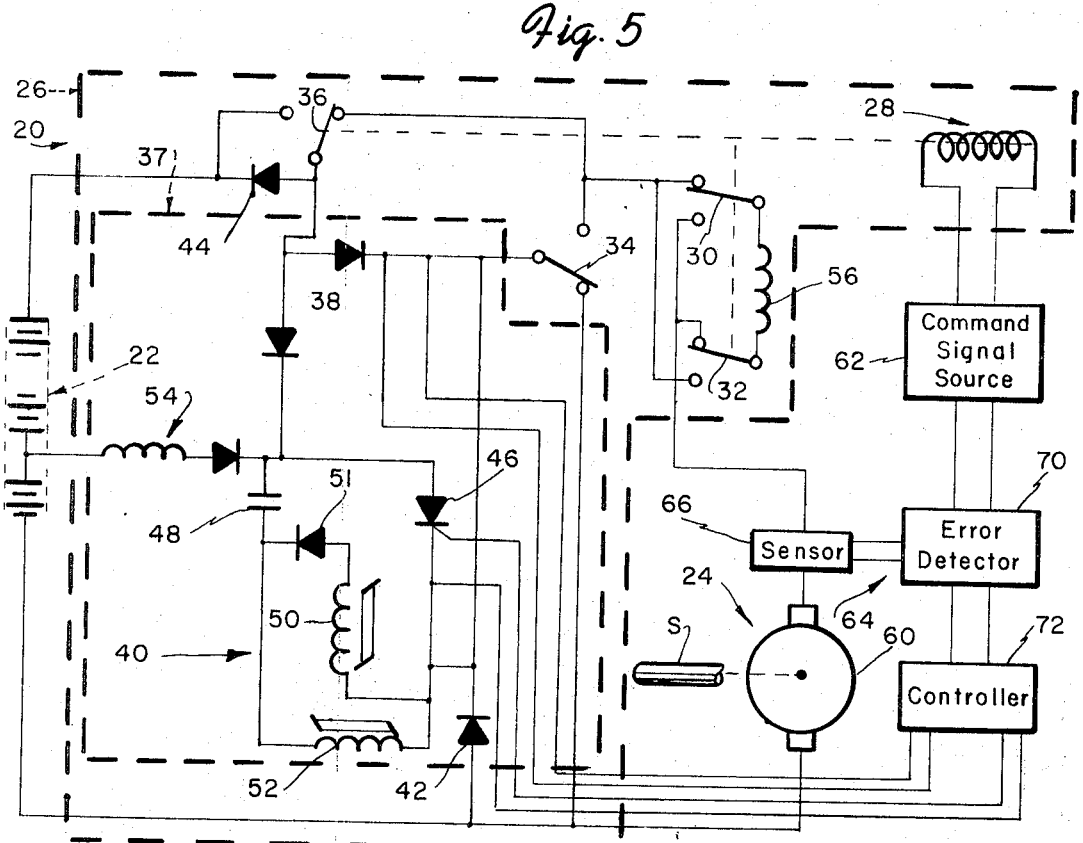
FIG. 5 is a circuit diagram of the drive in its regenerative mode.
Figure 6:
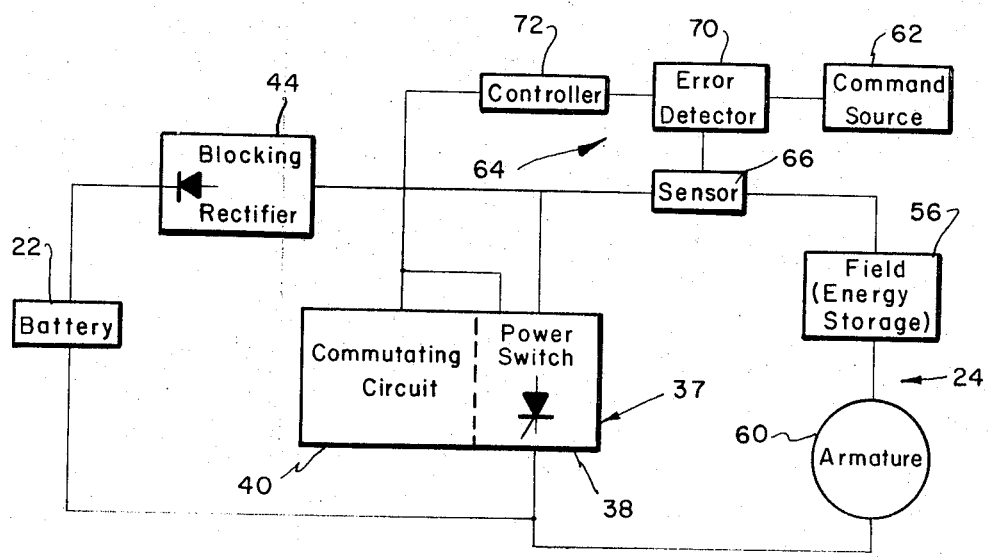
FIG. 6 is a block diagram of the drive in its regenerative mode.
Figure 7:
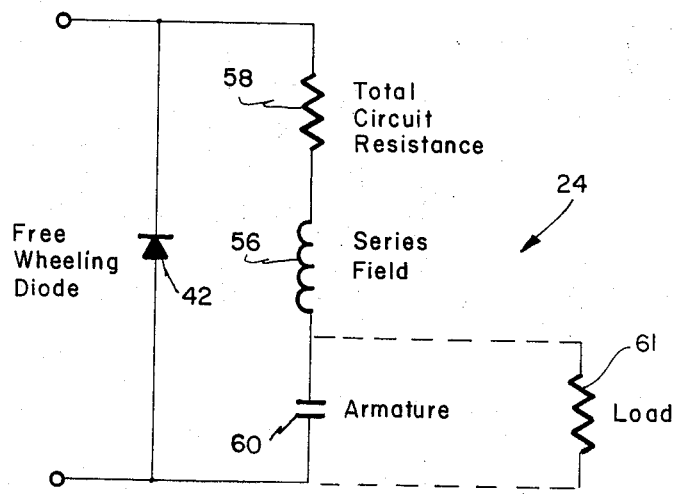
FIG. 7 is an equivalent circuit diagram of the motor-generator embodied in the drive.

As will be explained in more detail presently, the drive system 20 is operable in a drive mode (FIGS. 3, 4) and a regenerative mode (FIGS. 5,6). In the drive mode, the torquer 24 operates as a motor, and the processor 26 delivers pulses of electrical energy from the battery 22 to the torquer to drive the vehicle drive shaft S. In the regenerative mode, the torquer operates as a generator which is driven from the drive shaft S, as during down hill coasting of the vehicle, and the processor delivers pulses of electrical energy from the torquer to the battery for changing the battery and braking the vehicle.

Figure 3:
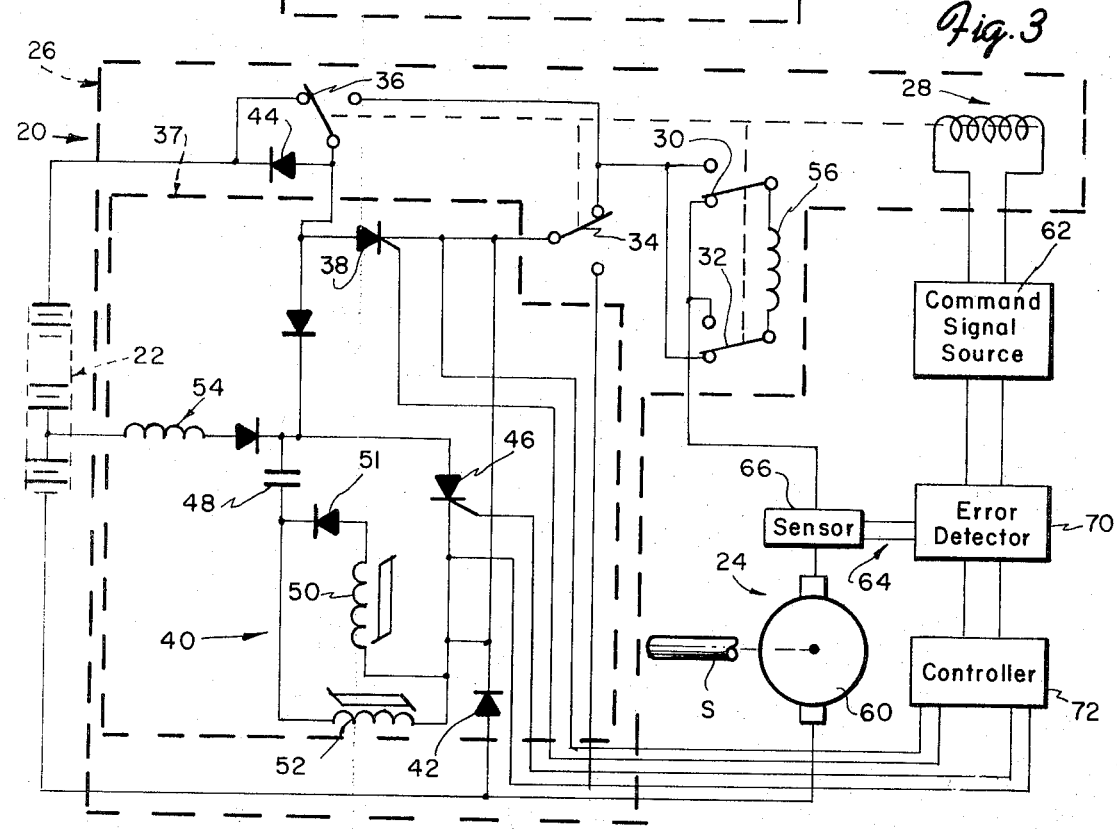
FIG. 3 is a circuit diagram of a battery powered regenerative vehicle drive embodying the invention showing the drive in its drive mode.
Figure 4:
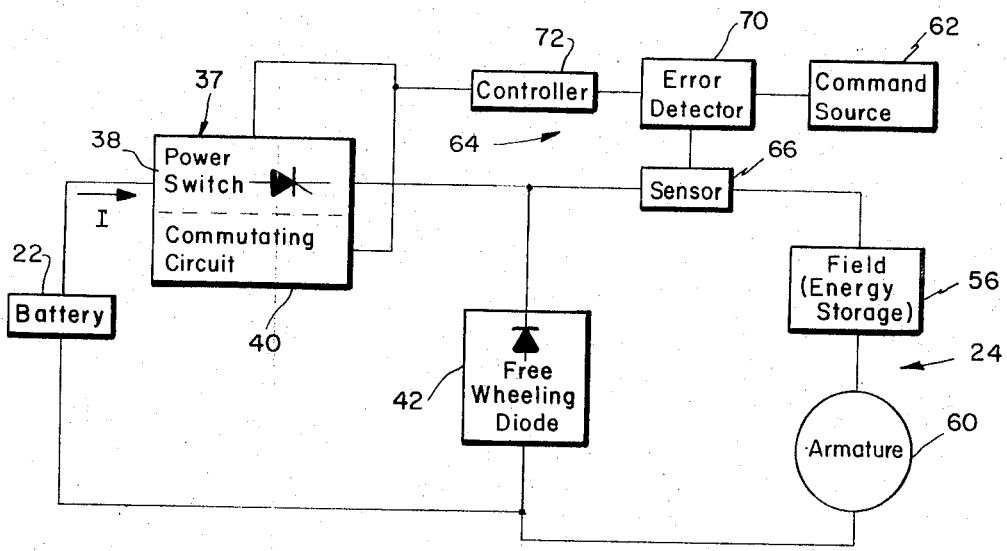
FIG. 4 is a block diagram of the drive in its drive mode.

Referring to FIG. 3, the power processor 26 comprises a mode control relay 28 having contacts 30, 32, 34, 36 for shifting between the drive and regenerative modes, a power switching circuit 37 including an SCR power switch 38 and a commutating network 40 for the power switch, a free-wheeling diode 42, and a blocking rectifier 44. The commutating network 40 is required because SCR 38 is utilized as a power switch and because of the d.c. operation of the drive and includes a commutating SCR switch 46, a commutating capacitor 48, a linear inductor 50 with its directional rectifier 51, a saturating reactor 52, and a precharge circuit 54. As will appear presently, the power switch 38 and commutating switch 46 are gated on by application of low power gating signals to their gates.

In both the drive and regenerative modes of the drive system, the capacitor 48 is initially charged through the precharge circuit 54. When the commutating SCR 46 is turned ON by application of a low power signal to its gate, with the power switch 38 in its ON state, capacitor 48 discharges through the linear inductor 50 while the saturating reactor 52 is blocking and resetting magnetically. The linear inductor 50 and capacitor 48 form a resonant circuit which oscillates at the resonant frequency of the circuit. During this oscillation, the power stored in capacitor 48 is transferred to the linear inductor 50 which, in turn, delivers the power to the capacitor in a reverse direction. This oscillation establishes the common node of the capacitor 48 and the saturating reactor 52 at a voltage approximately equal and opposite to the battery voltage. Thus, when the saturating reactor saturates, the power switch 38 and the commutating switch 46 are subjected to a reverse voltage across their terminals. This reverse voltage causes the switches 38 and 46 to turn OFF and stop conducting. Capacitor 48 recharges via the saturated saturable reactor 52, after which the power switch 38 may be gated ON by applying a gating signal to its gate and the above cycle repeated. Thus, the power switch 38 may be gated ON and OFF in alternate sequence by applying gating signals alternately to the gates of switches 38, 46.

The regenerative drive 20 is shifted between its drive and regeneration modes by operation of the mode control relay 28. When in the drive mode, the relay contacts 30, 32, 34, 36 are closed to their positions of FIG. 3 and the drive 20 assumes its drive configuration illustrated diagrammatically in FIG. 4. In this drive configuration, the torquer 24 and free-wheeling diode 42 are connected in parallel across the battery 22 through the power switch 38. As will be explained in more detail presently, during operation of the drive system, in its drive mode, the power switch 38 is gated ON and OFF in repetitive energy transfer cycle of duration T. Each time the power switch gates ON, the output voltage of the battery 22 is applied across the torquer 24, producing a current flow through the torquer and storing energy in its field. Each time the switch gates OFF, the stored energy in the torquer field discharges through the free-wheeling diode 42 to continue current flow through the torquer. In this regard, attention is directed to FIG. 7, wherein the torquer 24 is represented by an equivalent or analog circuit comprising an inductor 56 (series field), a series resistor 58 (total torquer circuit resistance), a large capacitor 60 (torquer armature), and a shunt resistor 61, representing the load, connected across the armature. When the power switch gates ON, battery current flow through and stores energy in the field inductor. If the torquer inductance is high, the energy stored in the inductor 56 during each ON period of the power switch will force current to continue circulating through the torquer armature and field circuit, returning via the free-wheeling diode 42, during the OFF period of the switch without significant decay. Under these conditions, the torquer current approaches a d.c. waveform. On the other hand, if the torquer inductance is small, its energy storage capacity will be small, and energy stored in the torquer field inductor will dissipate rapidly. The torque current will thus be discontinuous. Power switch 38 remains ON for a time ($t_{ON}$) during each energy transfer cycle and OFF for the remainder ($t_{OFF}$) of the cycle (T). The ratio of $t_{ON}$ to T ($t_{ON} + t_{OFF}$) is the duty cycle.

As will be explained presently, the duty cycle $\alpha$ is regulated to both maintain the power processor 26 in equilibrium and regulate the electrical power to the torquer 24. The electrical power delivered to the torquer 24 is proportional to $\alpha$ to a first approximation and may be expressed as $P = I_t V_B = I_t V_t$ \hfill (3)

where:
$P$ is the electrical power to the torquer;
$I_t$ is the torquer current;
$V_B$ is the battery voltage;
$V_t$ is the average torquer voltage.

From the equation (3) above, it is evident that the duty cycle may be expressed as $$\alpha = (V_t/V_B)$$

(4)

The torquer torque is proportional to the torquer current, and the torquer speed is proportional to the current and duty cycle.

Reference is now made to FIGS. 5 and 6 illustrating the drive 20 in its regenerative mode. In this mode, the relay contacts 30, 32, 34, 36 are closed to their positions of FIG. 5 and the drive assumes its regenerative configuration illustrated diagrammatically in FIG. 6. The torquer 24 is driven as a generator from the vehicle drive shaft S and delivers electrical charging current to the battery 22. Thus, when the torquer is driven as a generator, a voltage proportional to drive shaft speed and torquer field flux is developed across the torquer armature.

While the torquer armature voltage varies with drive shaft speed, the battery 22 and its load remain at a quasi constant voltage level. As the vehicle decelerates, the drive shaft speed and hence armature voltage decrease. As a consequence, means are required to effectively "ladle" charging current from the low armature voltage torquer to the battery. The illustrated drive 20 in its regenerative mode provides an all-electric pump circuit for electrically pumping current from the low voltage torquer to the higher voltage battery. In this regard, it will be seen in FIG. 6 that in the regenerative mode, the torquer 24 and power switch 38 are connected in parallel across the battery 22 through the blocking rectifier 44. Operation of the power switch between its OFF and ON states effects alternate energy storage in the torquer field inductor 56 and energy transfer from the field inductor to the battery 22. Thus, when the power switch 38 is ON, energy from the aramture 24 is stored in the field inductor 56. When the power switch is OFF, energy produced by the torquer as well as energy stored in the field inductor is delivered to the battery. The blocking rectifier 44 prevents the battery from discharging back to the torquer.

In this regenerative mode, the duty cycle $\alpha$ of the drive 20 is expressed by the equation:

$$\alpha = (t_{ON}/T) = (V_B - V_t/V_B) \quad (5)$$

where:

$V_B$ is the battery voltage;
$V_t$ is the average torquer voltage.

The average current $I_{Bt}$ delivered to the battery is expressed by the equation:

$$I_{Bt} = I_t(1-\alpha) \quad (6)$$

where:

$I_t$ is the torquer current (average).

At this point, it is evident that the drive system 20 provides an energy transfer system having a power source, a load, and a power processor 26 including energy storage means and switching means for transferring energy from the power source to the load in repetitive energy tranfer cycles of fixed duration each having an energy storage phase and an energy delivery phase. Thus, in the drive mode of the dirve system 20, the battery 22 provides the power source, the torquer 24 constitutes the load, and the torquer field inductor 56 is the energy storage means. In the energy storage phase of each energy transfer cycle, energy from the battery is stored in the field inductor and is also delivery to power the torquer armature. During the energy delivery phase of each cycle, this stored energy is delivered to the torquer to drive the vehicle. In the regenerative mode of the drive system 20, the torquer 24 provides the power source, the battery 22 the load, and the torquer field inductor 56 the energy storage means. During the storage phase of each energy transfer cycle, energy from the torquer is stored in its field inductor. During the energy delivery phase of each cycle, this stored energy is delivered to the battery to charge the latter and also produce a braking torque on the vehicle.

In each mode, the power delivered to the load is proportional to the duty cycle $\alpha$ and is regulated by varying the duty cycle. Thus, in the drive mode, regulation of the duty cycle varies the power delivered to the torquer 24 and hence the torque developed by the torquer and vehicle speed. In the regenerative mode, regulation of the duty cycle varies the power delivered by the torquer to the battery to charge the latter and hence the braking torque exerted on the vehicle by the torquer. It should be noted here that the energy storage device may be any inductor, not necessarily the torquer field, as shown.

Drive system 20 is equipped with a command signal source 62 which in this instance is a throttle pedal movable between a fully released or retracted position and a fully depressed or extended position. For convenience in the ensuing description, the range of pedal positions between the fully retracted and mode transfer positions is referred to as the braking range. The range of pedal positions between the mode transfer and fully depressed positions is referred to as the driving range. Throttle pedal control 62 operates a switch or the like which actuates the mode control relay 28 to its drive condition when the throttle pedal is within the driving range and to its regeneration condition when the pedal is within its braking range.

As will be explained in more detail shortly, the throttle pedal control 62 provides a torque command signal related to the throttle pedal position for controlling the drive system 20. Thus, when the throttle pedal is depressed through its driving range from the mode transfer position to the full depressed or maximum torque position, the throttle pedal control commands increasing driving torque. This increasing driving torque command effects an increase, at a controlled rate, of the driving mode duty cycle to increase the driving torque developed by the torquer 24 until the developed torque equals the commanded torque. Return of th throttle pedal to its mode transfer position has the opposite effect of reducing the driving torque. Similarly, when the throttle pedal is retracted through its braking range from the mode transfer position to its fully retracted or maximum braking position, the throttle pedal control 62 commands increasing braking torque. This increasing braking torque command effects an increse of the regenerative mode duty cycle to increase the braking torque developed by the torquer until the developed braking torque equals the commanded braking torque. Depression of the throttle pedal from its fully retracted position to its mode transfer position has the opposite effect of reducing the braking torque.

From the description to this point, it is evident that in any given fixed position of the throttle pedal, the drive system 20 should operate in a condition of steady state equilibrium, wherein the driving torque or braking torque, as the case may be depending upon the operating mode of the drive system, developed by the torquer 24 remains constant at the level commanded by the throttle pedal position. This equilibrium condition is achieved by maintaining the processor 26 in an equilibrium condition wherein the energy stored and delivered by the processor during each energy transfer cycle remain equal to one another and at the proper level to establish a developed torque in the torquer armature 24 equal to the torque commanded by the throttle pedal position. Under these conditions, the average stored energy level in the energy storage means remains substantially constant.

As in the earlier embodiments, power processor 26 has its own parametric regulating loop 64 for maintaining equilibrium by continuously sensing a control parameter which has a given steady state value when the drive system is in steady equilibrium, and regulating the duty cycle of the system in response to deviation of the parameter from its steady state value in such a way as to restore the system to equilibrium.

In the particular drive system 20 under discussion, the control parameter in response to which the duty cycle is regulated is current flow through the torquer field inductor 56. The duty cycle is regulated in response to deviation of the torquer current from its steady state value in order to maintain the drive system in equilibrium at any given torque level commanded by the throttle pedal control 62 by varying the period ($t_{ON}$) of the energy storage phase of each energy storage cycle. In the drive mode of the drive system, the duty cycle is thus regulated to satisfy equation (4) supra. In the regeneration mode, the duty cycle is regulated to satisfy equation (5).

To the above ends, the regulating loop 64 is equipped with a current sensor 66 in series with the torquer field inductor 56. Sensor 66 produces an output proportional to the current flow through the torquer field.

The output of sensor 66 is connected to an error detector 70 which receives an additional input, hereafter referred to as a torque command signal, from the command signal source or throttle pedal control 62. This torque command signal is a signal representing the driving torque or braking torque, as the case may be, corresponding to the throttle pedal position.

The output of error detector 70 is a signal representing the difference between the sensor and torque command signals to the detector. This output signal is fed to a power switch controller 72, such as a pulse width modulator, having outputs connected to the gates of power switch 38 and commutating switch 46. The switch controller feeds to the power and commutating switches gating signals for gating the switches ON and OFF in such a way as to establish a duty cycle $\alpha$ related to the amplitude of the input signal to the controller. More specifically, the controller feeds to the power switch 38 a gating signal having periodic gating pulses which gate the power switch ON for a period $t_{ON}$ proportional to the amplitude of the controller input signal. The controller feeds to the commutating switch 46 a gating signal having periodic gating pulses which occur between the gating pulses to the power switch and gate the commutating switch ON and thereby the power switch OFF for a period such that each power switch time ON, $t_{ON}$, pulse and the following power switch time OFF, $t_{OFF}$, have a total or combined period T.

The operation of the drive system 20 will now be described, assuming the throttle pedal to be initially in its fully released or retracted position with the vehicle stationary. Under these conditions, the mode control relay contacts 30, 32, 34, and 36 occupy their regeneration positions of FIGS. 5 and 6, the power switch 38 is OFF, the torquer 24 is stationary, and no current flow occurs in the drive system.

Assume now that the throttle pedal is depressed through its mode transfer position to a final position in its driving range corresponding to a selected driving torque of the motor 24. As the pedal passes through its mode transfer position, the pedal control 62 actuates the mode control relay 28 to shift its contacts to their drive positions of FIGS. 3 and 4 and feeds to the error detector 70 a torque command signal which progressively increases to a level representing the motor torque commanded by the final pedal position. Switch controller 72 then delivers to the power switch 38 and commutating switch 46 gating signals which gate the power switch ON and OFF to deliver energizing current to the torquer 24 in the earlier described energy transfer cycles and thereby accelerate the vehicle with a driving torque equal to the command torque. During cruising with the throttle pedal in a fixed drive position, such that the error detector 70 receives a fixed torque command signal, the regulating loop 64 of the power processor 26 operates to regulate the processor duty cycle in response to the control parameter (current flow through the torquer field inductor 56) to maintain the processor in an equilibrium condition wherein the energy stored and the energy delivered to the torquer during successive transfer cycles remain equal and constant.

Braking of the vehicle is accomplished by effecting retraction of the throttle pedal to its braking range to shift the contacts of the mode control relay 28 to their regenerative or braking positions of FIGS. 5 and 6. The torquer 24 is then driven as a generator from the drive shaft S and delivers charging current through the power processor 26 to the battery 22 in the earlier described energy transfer cycles. The torquer thereby also produces a braking torque for decelerating the vehicle. In this braking mode with the throttle pedal in a fixed braking position, the regulating loop 64 of the power processor 26 operates to regulate the processor duty cycle in response to the control parameter (current flow through the torquer field inductor) to maintain the processor in an equilibrium condition wherein the energy stored and the energy delivered to the battery during successive energy transfer cycles remain equal and constant.

The power switch controller 72 may comprise any suitable circuitry for delivering gating signals to the power and commutating switches 38, 46 in the manner explained. By way of example, this controller may comprise a clock pulser and variable time pulser similar to those described in the earlier mentioned U.S. Pat. No. 3,566,717.

In the drive system of FIGS. 3 through 7, the control parameter which is sensed to maintain the power processor in equilibrium and the output quantity of the system which is controlled to retain it at a steady state level by maintaining equilibrium are the same, namely torquer current or torque. However, in other applications, the control parameter and controller quantity may be different quantities.

What is claimed as new in support of Letters Patent is:

1. The method of delivering energy from a power source to a load which comprises the steps of:
coupling an energy storage means to said source and load alternately to effect energy transfer from said source to said load in repetitive energy transfer cycles each having an energy storage phase during which said storage means receives and stores energy from said source and an energy delivery phase during which said storage means delivers stored energy to said load, whereby the energy transfer occurs in periodic fashion with a duty cycle which equals the ratio of one transfer cycle phase period to the total transfer cycle period and which duty cycle may be regulated to maintain an equilibrium condition wherein the energy stored in and the energy delivered by said storage means during successive energy transfer cycles remain substantially equal and constant such that the average stored energy level in said storage means remains substantially constant at a steady state level;

sensing a control parameter which deviates from a steady state value in response to and concurrently with deviation of said average stored energy level from said steady state level; and regulating said duty cycle in response to said control parameter to maintain said equilibrium condition.

2. The method of claim 1 wherein:

said energy is electrical energy; and said control parameter is an electrical quantity related to the stored energy level in said storage means.

3. The method of claim 2 wherein:

said storage means comprises and electrical inductor; and said control parameter is current flow through said inductor.

4. An energy transfer system for transferring energy from a power source to a load comprising:

energy transfer means including input means for connection to said power source, output means for connection to said load, energy storage means, and time ratio means for effecting energy transfer from said input means to said output means in repetitive energy transfer cycles each having and energy storage phase during which said storage means receives and stores energy supplied to said input means and an energy delivery phase during which said storage means delivers stored energy to said output means, whereby said transfer means has a duty cycle which equals the ratio of one transfer cycle phase period to the total transfer cycle period and which duty cycle may be regulated to maintain an equilibrium condition wherein the energy stored in and the energy delivered by said storage means during successive energy transfer cycles remain substantially equal and constant such that the average stored energy level in said storage means remains substantially constant at a steady state level;

means for sening a control parameter which deviates from a steady state value in response to and concurrently with a deviation of said average stored energy level from said steady state level; and means for regulating said duty cycle in response to said control parameter to maintain said equilibrium condition.

5. An energy transfer system according to claim 4 wherein:

said power source and load comprise an electrical power source and an electrical load, respectively;

said storage means comprises an electrical energy storage means;

said time ratio means comprises electrical switching means operable alternately to one state to connect said storage means to said input means and to another state to connect said storage means to said output means;

said control parameter is an electrical quantity related to the stored energy level in said storage means.

6. An energy transfer system according to claim 5 wherein: said storage means comprises an electrical inductor.

7. An energy transfer system according to claim 6 wherein: said control parameter is current flow through said inductor.

* * * * *